United States Patent
Chida et al.

(10) Patent No.: US 7,926,872 B2
(45) Date of Patent: Apr. 19, 2011

(54) VEHICLE SEAT

(75) Inventors: Jun Chida, Tokyo (JP); Kazuki Okamoto, Tokyo (JP); Nozomu Munemura, Yokohama (JP); Atsuo Matsumoto, Yokohama (JP)

(73) Assignees: Fuji Heavy Industries, Ltd., Tokyo (JP); NHK Spring Co., Ltd., Yokohama-shi (JP)

( * ) Notice: Subject to any disclaimer, the term of this patent is extended or adjusted under 35 U.S.C. 154(b) by 204 days.

(21) Appl. No.: 12/258,589

(22) Filed: Oct. 27, 2008

(65) Prior Publication Data

US 2009/0108646 A1 Apr. 30, 2009

(30) Foreign Application Priority Data

Oct. 31, 2007 (JP) ................... 2007-284262

(51) Int. Cl.
*B60N 2/42* (2006.01)
*A47C 7/02* (2006.01)
(52) U.S. Cl. .......... 297/216.14; 297/216.13; 297/452.52
(58) Field of Classification Search ............ 297/216.13, 297/216.14, 452.49, 452.42, 452.53
See application file for complete search history.

(56) References Cited

U.S. PATENT DOCUMENTS

| | | | | |
|---|---|---|---|---|
| 6,086,097 | A * | 7/2000 | Van Wynsberghe | 280/748 |
| 6,520,577 | B2 * | 2/2003 | Kitagawa | 297/216.13 |
| 6,755,476 | B2 * | 6/2004 | Kawashima et al. | 297/452.52 |
| 6,994,399 | B2 * | 2/2006 | Van-Thournout et al. | 297/284.4 |
| 7,252,335 | B2 * | 8/2007 | Samain et al. | 297/284.4 |
| 2003/0085600 | A1 * | 5/2003 | Mori | 297/284.4 |
| 2004/0140705 | A1 * | 7/2004 | McMillen et al. | 297/378.1 |
| 2005/0040686 | A1 | 2/2005 | Van-Thournout et al. | |

FOREIGN PATENT DOCUMENTS

| | | |
|---|---|---|
| DE | 602 09 249 T2 | 8/2006 |
| JP | 11-268566 A | 10/1999 |
| JP | 2001-58533 A | 3/2001 |
| JP | 2007-106378 A | 4/2007 |

OTHER PUBLICATIONS

German Office Action dated Jul. 14, 2009 and English translation thereof issued in counterpart German Application No. 10 2008 053 471.4.

* cited by examiner

*Primary Examiner* — Sarah B McPartlin
(74) *Attorney, Agent, or Firm* — Holtz, Holtz, Goodman & Chick, PC

(57) ABSTRACT

A seat back has a seat back frame, a plane spring structure, and a headrest provided at the upper end of a seat back frame. The plane spring structure has left and right side wires, and horizontal wires extending in the horizontal direction. Connection wires are provided between the seat back frame and plane spring structure. First end portions and second end portions of the connection wires function as detachable portions. At least one of these detachable portions is detached from the seat back frame or plane spring structure by the load applied to the seat back, when a vehicle is bumped from behind.

10 Claims, 5 Drawing Sheets

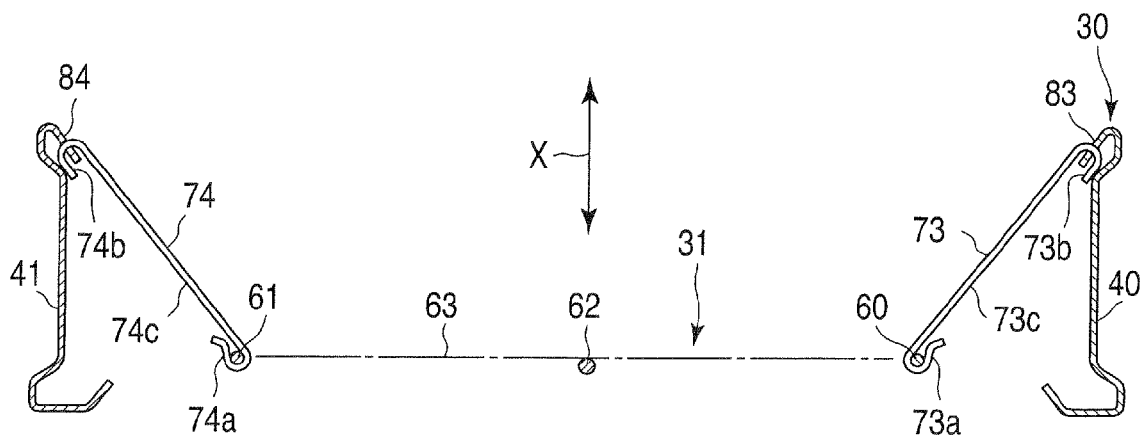
F I G. 4
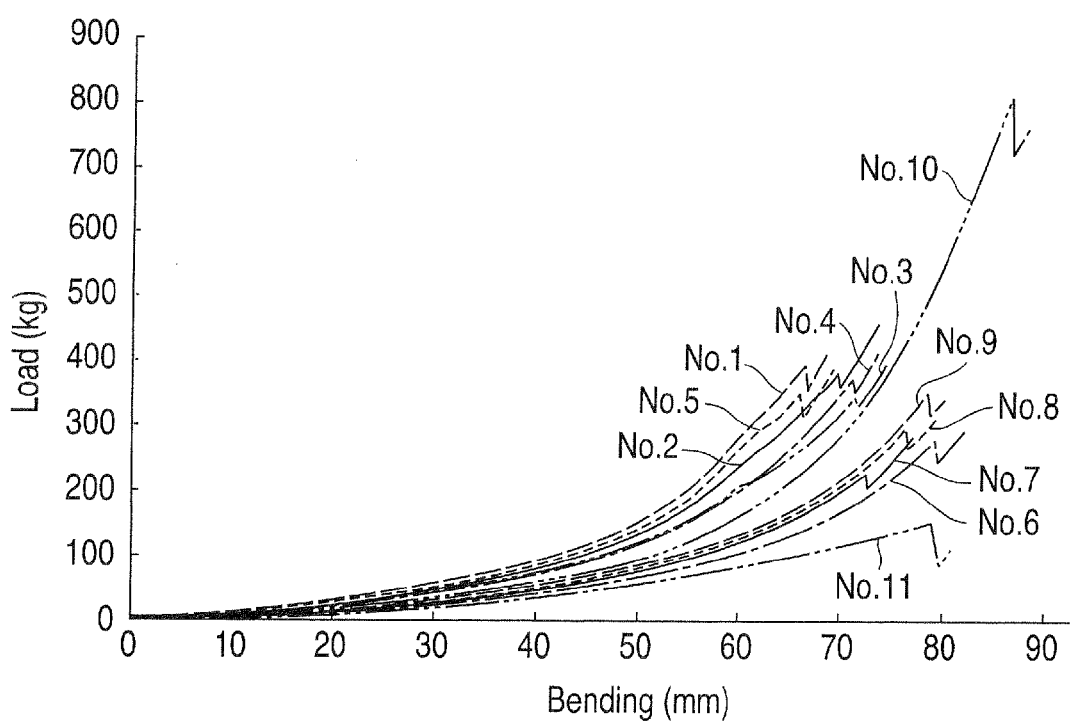
F I G. 5

VEHICLE SEAT

CROSS-REFERENCE TO RELATED APPLICATIONS

This application is based upon and claims the benefit of priority from prior Japanese Patent Application No. 2007-284262, filed Oct. 31, 2007, the entire contents of which are incorporated herein by reference.

BACKGROUND OF THE INVENTION

1. Field of the Invention

The present invention relates to a vehicle seat having a headrest.

2. Description of the Related Art

There has been proposed a headrest drive capable of moving a headrest forward to hold an occupant's head when a vehicle is bumped from behind. For example, Jpn. Pat. Appln. KOKAI Publication No. 11-268566 (patent document 1) discloses a conventional headrest drive, in which a connection member is arranged in the lower part of a bracket to support a stay of a headrest. The connection member is provided with a pressure-receiving member. In this conventional example, when an occupant is pressed to a seat back upon a collision, the pressure-receiving member is pressed rearward, the connection member is driven, and the headrest is moved forward.

Jpn. Pat. Appln. KOKAI Publication No. 2001-58533 (patent document 2) discloses another conventional headrest drive, in which a pressure-receiving member is arranged above an S-shaped spring of a seat back. In this conventional example, the pressure-receiving member is fixed to the lower part of a headrest holder bracket. When a vehicle is bumped from behind, the pressure-receiving member is pushed rearward by the load applied to a seat back from an occupant, and a headrest is moved forward.

It is known that when a vehicle is bumped from behind, a vehicle seat having a headrest drive behaves as shown in FIG. 7. In FIG. 7, the characteristic curve A drawn by a solid line indicates rearward movement (X-amount) of an occupant's head with time. The characteristic curve B drawn by a broken line indicates rearward movement (X-amount) of a headrest with time. At a point of intersection C of the characteristic curves A and B, the occupant's head contacts the headrest.

In a vehicle seat having a headrest drive, a characteristic curve includes a flat part F (shown in FIG. 7) showing a relatively small increase in the X-amount of a headrest. The time taken by the occupant's head to contact the headrest (the time from a collision to the point C) can be shortened by the flat part F.

Jpn. Pat. Appln. KOKAI Publication No. 2007-106378 (patent document 3) discloses another vehicle seat, which has a connection member to connect the upper part of a seat back frame to the upper part of a plane spring structure, and a shock-absorbing part provided in the connection member. According to the patent document 3, a vehicle seat facilitates rearward movement of an occupant upon a collision from behind.

In the vehicle seat with a headrest drive incorporated in a seat back as described in the patent documents 1 and 2, the weight of a seat is increased by the weight of a headrest drive. The structure of a headrest drive is complicated, and the seat cost is increased.

In the vehicle seat described in the patent document 3, a shock-absorbing part is provided in a connection member provided in the upper part of a seat back. In this structure, the shock-absorbing part cannot function effectively, when a relatively large load is applied to the lower half part of a seat back from the part around an occupant's waist upon a collision from behind. Namely, when a seat back is moved rearward by the load applied to a seat back, a headrest is also moved rearward, and a head support function equivalent to the movable headrest drive is not obtained.

BRIEF SUMMARY OF THE INVENTION

The present invention provides a vehicle seat having a headrest, which has a simple structure compared with a headrest drive, and supports quickly the head of an occupant when a vehicle is bumped from behind.

According to an aspect of the invention, there is provided a vehicle seat comprising a seat cushion on which an occupant sits; a seat back which is provided at the rear of the seat cushion, and is provided with a seat back frame having left and right side frame units; a headrest which is provided at the upper end of the seat back frame; left and right side wires which are provided inside the seat back frame, and extended in the vertical direction; a plane spring structure having horizontal wires provided between the side wires at some intervals in the vertical direction; connection wires provided between the seat back frame and plane spring structure; and a pad member provided on the front side of the plane spring structure, wherein the connection wires have detachable portions. The detachable portions are detached from the plane spring structure or seat back frame by the load applied to the seat back from an occupant sitting on the seat cushion, when a vehicle is bumped from behind. The detachable portions are formed at the end portions of the connection wires for example.

According to the invention, when a vehicle is bumped from behind, the detachable portions are detached from a plane spring structure or a seat back frame by the load applied from an occupant to the seat back. Therefore, the rearward movement of the seat back is restricted, and an occupant's head can contact the headrest within a short time. The rearward movement of the occupant's head is quickly stopped by the headrest. The vehicle seat of the invention is simple in the structure compared with a headrest drive, and quickly holds an occupant's head.

The detachable portions of the connection wires are configured to disengage from the plane spring structure or seat back frame, when the load applied to the seat back is over 150 kgf and below 800 kgf, for example. The detachable portions of the connection wires are U-shaped hooks, for example. In a preferable embodiment of the invention, the upper end portion of the plane spring structure is secured to the upper part of the seat back frame, and the connection wires are arranged in the lower half part of the plane spring structure. A preferable embodiment may have the upper side connection wires arranged in the upper half part of the plane spring structure, and the lower side connection wires arranged in the lower half part of the plane spring structure, wherein when the load is applied to the seat back, at least the lower side connection wires are detached.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a transverse sectional view of the seat back frame and plane spring structure shown in FIG. 2;

FIG. 5 is a graph showing the relationship between bending and load in two or more kinds of connection wires;

DETAILED DESCRIPTION OF THE INVENTION

An embodiment of the invention will be explained hereinafter with reference to FIG. 1 to FIG. 6.

Figure 1:
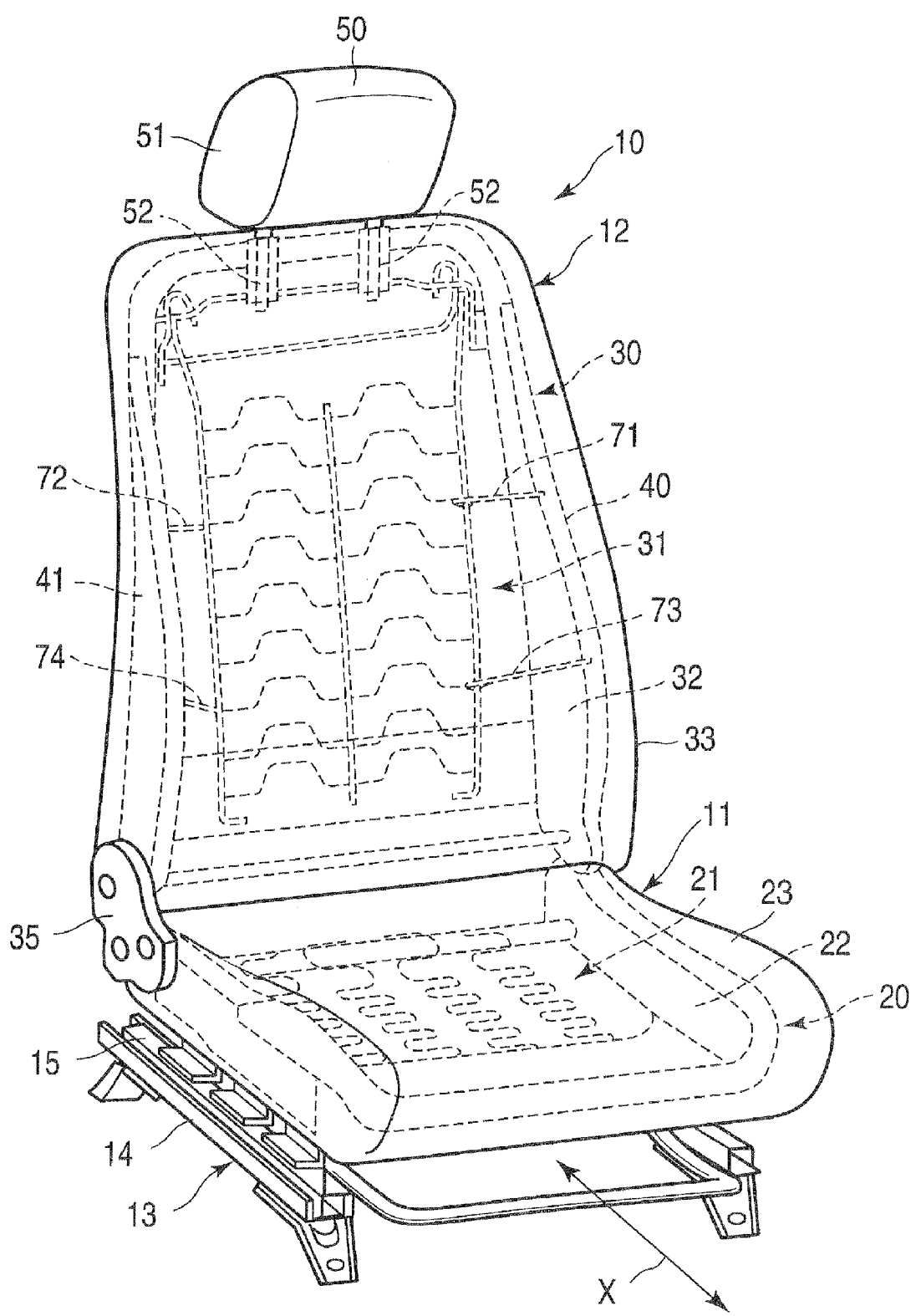
FIG. 1 is a perspective view of a vehicle seat according to an embodiment of the invention.

FIG. 1 shows a vehicle seat 10. The vehicle seat 10 comprises a seat cushion 11, and a seat back 12 provided at the rear of the seat cushion 11. A slide mechanism 13 is provided on the lower side of the seat cushion 11. The slide mechanism 13 has a fixed rail 14, a movable rail 15, and a lock mechanism (not shown). The fixed rail 14 is fixed to the floor of a vehicle (not shown). The movable rail 15 is movable in the longitudinal direction of a vehicle with respect to the fixed rail 14. The lock mechanism has a function to fix the movable rail 15 to the fixed rail 14. In FIG. 1, the longitudinal direction of a vehicle is indicated by the arrow X.

The seat cushion 11 comprises a seat cushion frame 20, a spring unit 21, a pad member 22, and a cover member 23. The spring unit 21 includes S-springs secured to the seat cushion frame 20. The pad member 22 is provided on the spring unit 21. The cover member 23 covers the outer surface of the pad member 22. The movable rail 15 of the slide mechanism 13 is fixed to the seat cushion frame 20.

The seat back 12 comprises a seat back frame 30, a plane spring structure 31, a pad member 32, and a cover member 33. The pad member 32 is provided on the front side of the plane spring structure 31. The cover member 33 covers the pad member 32. The seat back 12 is fixed to the rear of the seat cushion frame 20. The seat back 12 is changeable in the longitudinal inclination angle by a hinge unit 35 having a reclining mechanism.

Figure 2:
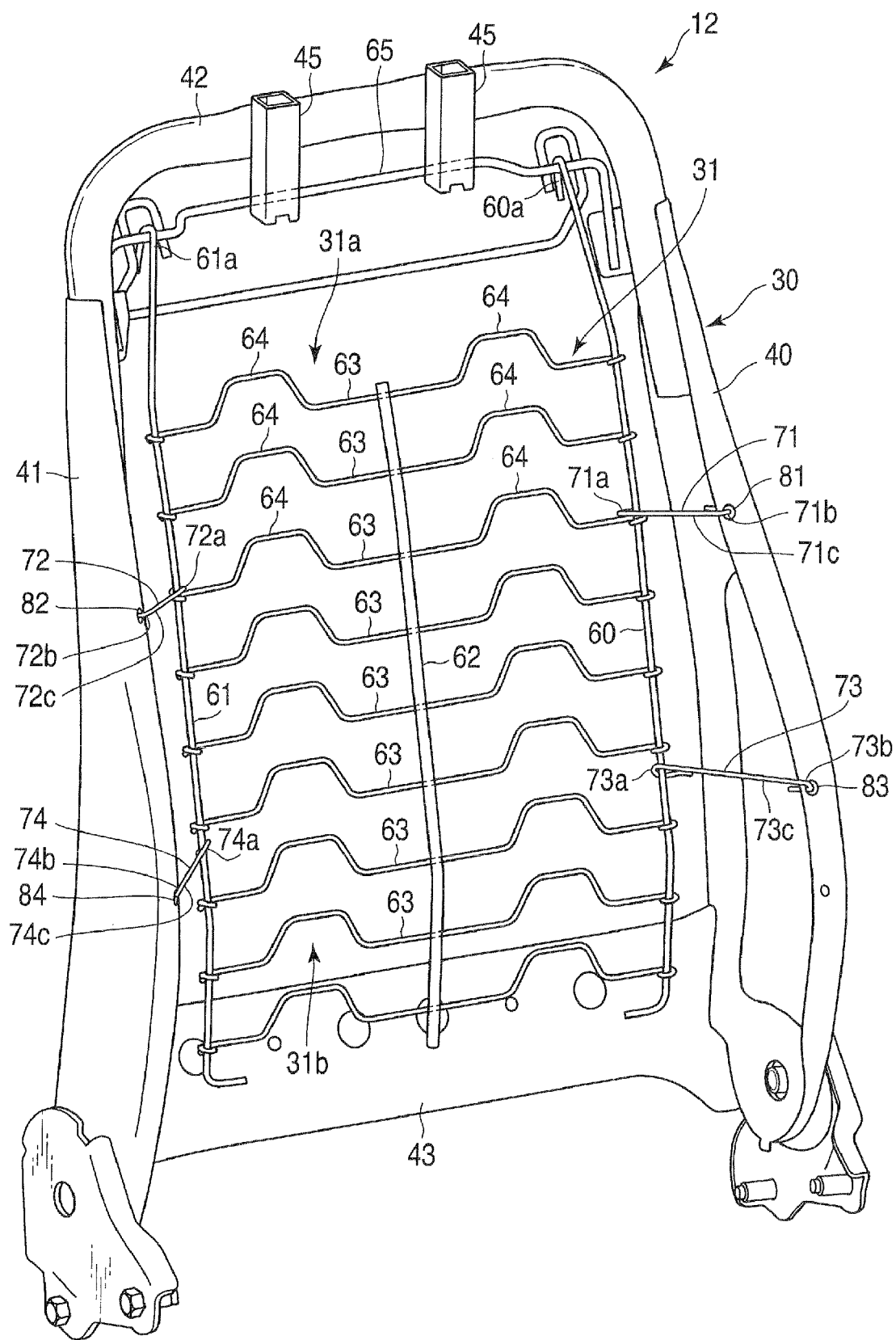
FIG. 2 is a perspective view showing a seat back frame and a plane spring structure of the vehicle seat shown in FIG. 1.

FIG. 2 shows a seat back frame 30, and a plane spring structure 31. The seat back frame 30 comprises left and right side frame units 40 and 41, an upper frame unit 42, and a lower frame unit 43. The side frame units 40 and 41 formed by pressing a steel sheet metal, for example. The upper frame unit 42 connects the upper parts of the side frame units 40 and 41. The lower frame unit 43 connects the lower parts of the side frame units 40 and 41. A headrest bracket 45 is fixed to the upper frame unit 42. The seat back frame is substantially a rigid structure.

As shown in FIG. 1, a headrest 50 is provided at the upper end of the seat back 12. The headrest 50 comprises a headrest main body 51, and left and right stays 52. The headrest main body 51 is provided at the upper end portion of the seat back 12. The stay 52 extends downward from the headrest main body 51. The headrest bracket 45 is provided in the seat back frame 30. The stay 52 is inserted into the headrest bracket 45, and can be fixed at a desired height by a not-shown stopper mechanism.

As shown in FIG. 2, the plane spring structure 31 comprises left and right side wires 60 and 61 provided on both sides, a center cord 62 provided at the center, and horizontal wires 63. The horizontal wires 63 are provided between the side wires 60 and 61. The side wires 60, 61 and center cord 62 extend in the vertical direction. The horizontal wires 63 extend in the horizontal direction. The plane spring structure 31 is arranged inside the seat back frame 30. The plane spring structure 31 supports a rearward load applied from the waist and back of an occupant sitting on the seat cushion 11.

The horizontal wires 63 are arranged at some intervals in the vertical direction of the plane spring structure 31. The horizontal wires 63 are made of spring steel wire with a diameter smaller than that of the side wires 60 and 61. Both ends of each horizontal wire 63 are fixed to the side wires 60 and 61. Each horizontal wire 63 has a projected portion 64 which is projected upward. The projected portion 64 is formed horizontally symmetrical on both sides of the center cord 62. The projected portion 64 is formed on the same plane. Therefore, the plane spring structure 31 is shaped like a mat having a substantially plane surface. The projected portion 64 may be S-shaped or Z-shaped. The horizontal wires 63 may be shaped straight.

The upper end portions 60a and 61a of the side wires 60 and 61 are secured to the upper part of the seat back frame 30 through a support wire 65. The support wire 65 is arranged in the upper part of the seat back frame 30. The lower ends of the side wires 60 and 61 are set free without being secured to the seat back frame 30. Therefore, when a rearward load is applied from the seat back 12 to the plane spring structure 31, the whole plane spring structure 31 can be moved a little in the longitudinal direction around the upper end portions 60a and 61a of the side wires 60 and 61 acting as fulcrums. Besides, a lower half part 31b of the plane spring structure 31 can be moved a little farther than an upper half part 31a.

Figure 3:
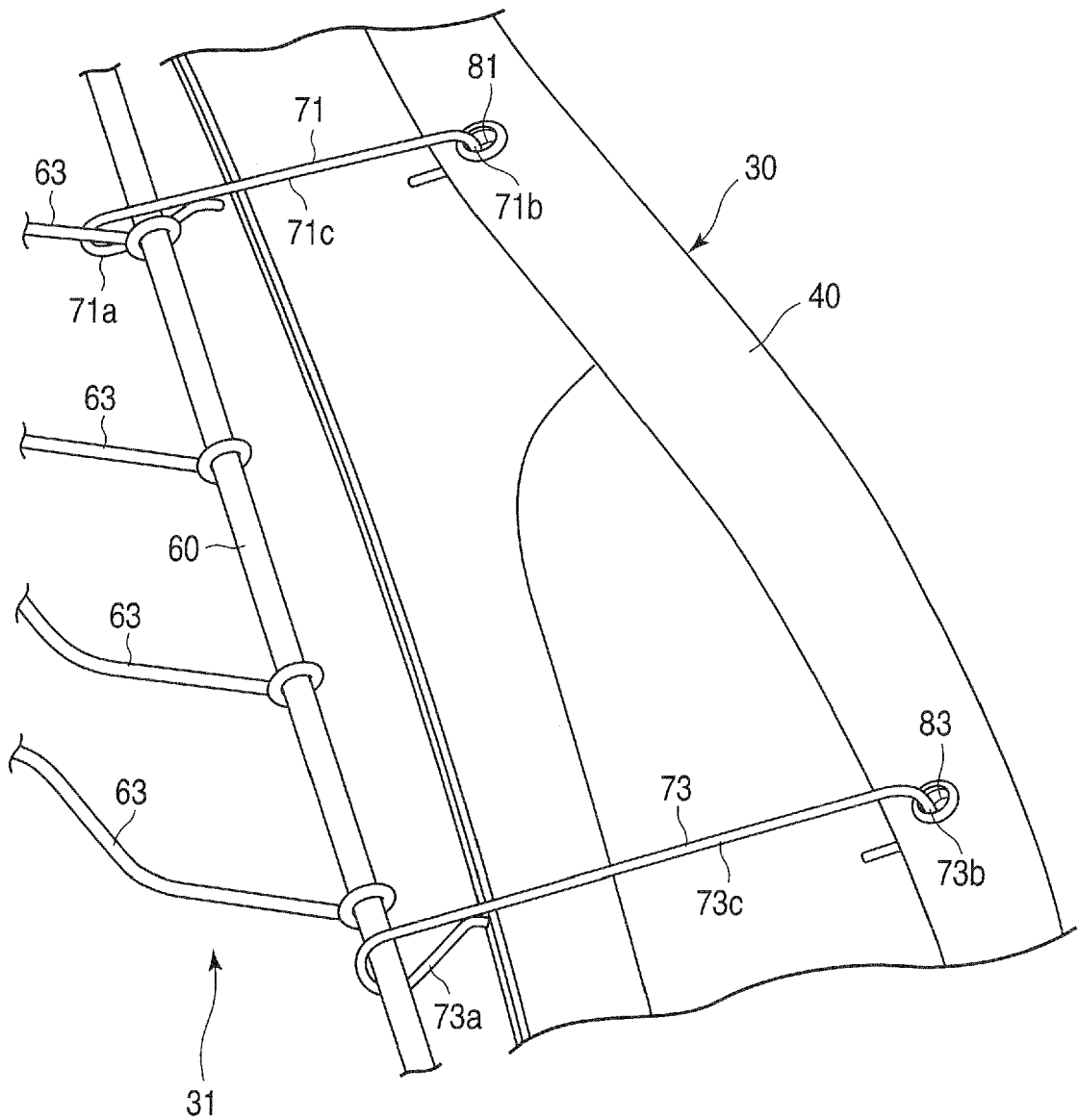
FIG. 3 is an enlarged perspective view of a part of the seat back frame and plane spring structure shown in FIG. 2.

FIG. 3 shows a part of the seat back frame 30 and plane spring structure 31. FIG. 4 is a transverse sectional view of the seat back frame 30.

Side wires 60 and 61 are arranged on both sides of the plane spring structure 31. These side wires 60 and 61 are secured to the seat back frame 30 through connection wires 71, 72, 73 and 74. More specifically, the upper half part 31a of the plane spring structure 31 is supported by the side frame units 40 and 41 through the upper side left and right connection wires 71 and 72. The lower half part 31b of the plane spring structure 31 are supported by the side frame units 40 and 41 through the lower side left and right connection wires 73 and 74.

The connection wires 71, 72, 73 and 74 are formed by bending a metal wire such as a steel wire with a diameter smaller than that of the side wires 60 and 61 in the following manner. Namely, the connection wires 71, 72, 73 and 74 have U-shaped hook-like first end portions 71a, 72a, 73a and 74a, U-shaped hook-like second end portions 71b, 72b, 73b and 74b, and straight linear portions 71c, 72c, 73c and 74c. The straight linear portions 71c, 72c, 73c and 74c are formed between the first end portions 71a, 72a, 73a and 74a and second end portions 71b, 72b, 73b and 74b. The first end portions 71a, 72a, 73a and 74a and second end portions 71b, 72b, 73b and 74b function as detachable portions.

The first end portions 71a, 72a, 73a and 74a are wound and secured to the side wires 60 and 61 of the plane spring structure 31, as partially shown in FIG. 3. The side frame units 40 and 41 of the seat back frame 30 have holes 81, 82, 83 and 84. The second end portions 71b, 72b, 73b and 74b are inserted into these holes 81, 82, 83 and 84, thereby they are secured to the side frame units 40 and 41.

The first end portions 71a, 72a, 73a and 74a function as detachable portions. When a tensile load larger than a predetermined value is applied to the connection wires 71, 72, 73 and 74, the curved ends of these first end portions are deformed and extended, and the first end portions are detached from the side wires 60 and 61 of the plane spring structure 31.

The second end portions 71b, 72b, 73b and 74b function also as detachable portions. When a tensile load larger than a predetermined value is applied to the connection wires 71, 72, 73 and 74, the curved ends of these second end portions are deformed and extended, and the second end portions are detached from the holes 81, 82, 83 and 84 of the seat back frame 30.

As indicated by the curves No. 1 to No. 11 in FIG. 5, the connection wires 71, 72, 73 and 74 have characteristics so as to be detached from the plane spring structure 31 or seat back frame 30, when a load over 150 kgf (1470N) and below 900 kgf (8820N) is applied to the seat back 12 and the seat back 12 is bent to 65 to 85 mm.

For example, in the example indicated by the curve No. 1 in FIG. 5, when a load of 400 kgf (3920N) is applied to the seat back 12 and the seat back 12 is deformed to 65 mm, one of first and portions 73a and 74a of the lower side connection wires 73 and 74 was detached from the plane spring structure 31. Therefore, the load is temporarily decreased when the seat back is deformed to about 65 mm. But, the plane spring structure 31 is maintained to be supported by the other not-detached end portion, pad member 32, and cover member 33, so that the load is increased again. The curves No. 1 to No. 11 indicate such characteristics.

In this embodiment, the lower side connection wires 73 and 74 supporting the lower half part 31b of the plane spring structure 31 were detached from the plane spring structure 31. The reason is that the load applied from the waist of an occupant to the lower half part of the seat back 12 was larger than the load applied to the upper half part of the seat back 12, the upper end portions 60a and 61a of the side wires 60 and 61 of the plane spring structure 31 are secured to the upper part of the seat back frame 30, and the lower half part 31b of the plane spring structure 31 is movable more easily than the upper half part 31a.

By extending both ends of the horizontal wire 63, the horizontal wire 63 may be formed in one body with the connection wires connected to both ends of the horizontal wire. At the end of the connection wire, a hook-like detachable portion detachable from the seat back frame upon a collision from behind is formed. In this case, the diameters of the horizontal wire 63 and connection wire become the same.

Next, an explanation will be given on the function of the vehicle seat 10 configured as described hereinbefore.

When a vehicle provided with the seat 10 is bumped from behind, a rearward load is transmitted to the seat back 12 from an occupant sitting on the seat cushion 11. The load is applied to the plane spring structure 31, and the plane spring structure 31 is bent. When the load exceeds a predetermined value, at least one of the first end portions 71a, 72a, 73a and 74a of the connection wires 71, 72, 73 and 74 are detached from the plane spring structure 31, or one of the second end portions 71b, 72b, 73b and 74b is detached from the seat back frame 30. In this embodiment, at least one of the first end portions 73a and 74a of the lower side connection wires 73 and 74 which support the lower half part of the plane spring structure 31 was detached from the plane spring structure 31.

Figure 6:
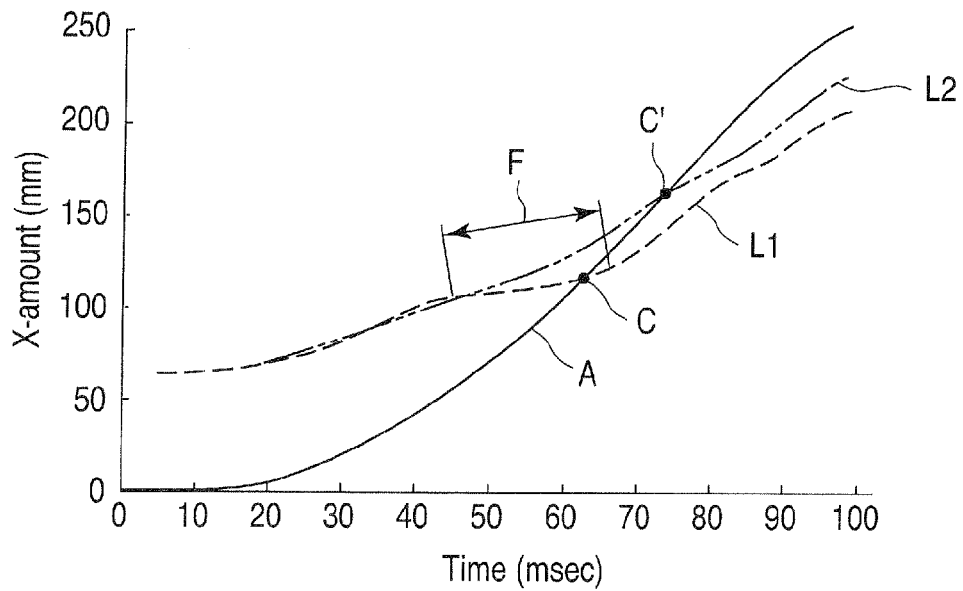
FIG. 6 is a graph showing the relationship between time and headrest moving distance when a load is applied to the seat back of the vehicle seat shown in FIG. 1.
Figure 7:
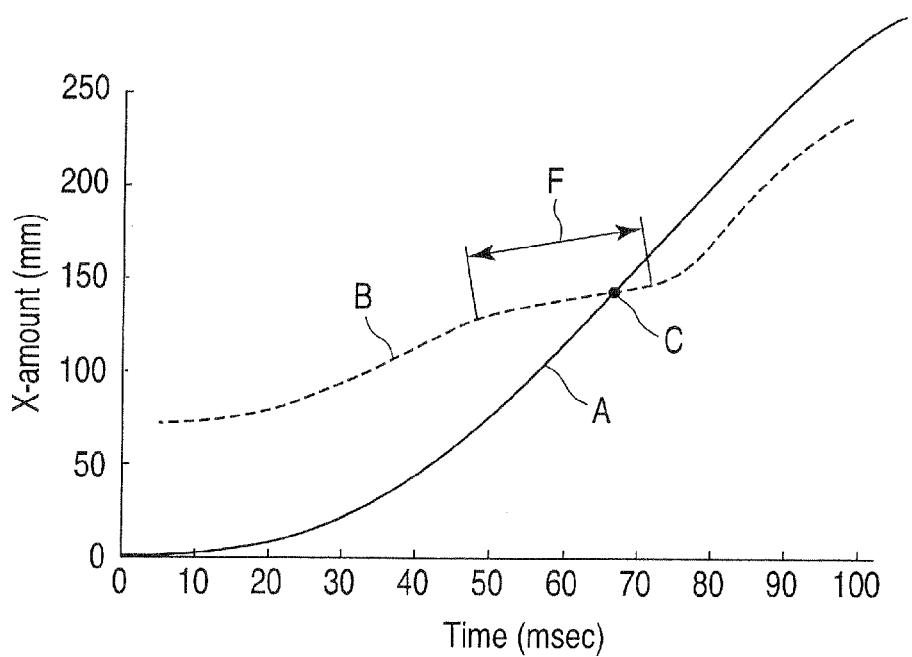
FIG. 7 is a graph showing relationship between time and headrest moving distance when a load is applied to a conventional seat back.

In FIG. 6, the characteristic curve A drawn by a solid line indicates movement (X-amount) with time of an occupant's head in the longitudinal direction upon a collision from behind. The characteristic curve L1 drawn by a broken line indicates movement (X-amount) with time of the headrest 50 having the connection wires 71, 72, 73 and 74 of this embodiment in the longitudinal direction.

According to this embodiment, when a vehicle is bumped from behind, at least one of the connection wires 73 and 74 is detached from the plane spring structure 31. Therefore, the relative movement of the side wires 60 and 61, center cord 62 and horizontal wire 63, which are moved back by the load from an occupant, with respect to the seat back frame 30 is increased. Therefore, the X-amount of the headrest 50 connected to the seat back frame 30 through the headrest bracket 45 is restricted, and the characteristic curve L1 includes a flat portion F in which the X-amount of the headrest is relatively small.

Therefore, according to this embodiment, the time taken by the occupant's head to be held by the headrest (the time from a collision to the point C) can be reduced. This is effective to decrease a whiplash injury.

The characteristic curve L2 drawn by a chain double-dashed line in FIG. 6 indicates the measurement result of the seat back in a comparative example using a connection wire having no detachable portions. In this comparative example, a connection wire is arranged connected not to detach from a seat back frame and plane spring structure. The characteristic curve L2 in the comparative example indicates that the X-amount of the headrest is increased at a substantially constant ratio, as the load is increased. Therefore, the characteristic curve L2 in the comparative example indicates that the time taken by the occupant's head to be held (the time from a collision to the point C') is longer than in the characteristic curve L1.

In FIG. 5, the examples indicated by the curves No. 1 to No. 11 indicate seat backs configured so that a detachable portion of a connection wire is detached by a load of 150 to 900 kgf. According to the experiment done by the inventor, these seat backs could generate a flat portion F in the characteristic curve L1 (shown in FIG. 6) indicating the X-amount of a headrest, as in the seat back having a headrest drive. A head holding effect equivalent to a headrest drive could not be obtained in a seat back, in which a connection wire is not detached by the above range of load.

As explained herein, the seat back 12 of this embodiment is configured so that when a vehicle is bumped from behind, at least one of the detachable portions of the connection wires 71, 72, 73 and 74 is detached from the plane spring structure 31 or seat back frame 30 by the load applied to the seat back 12 upon a collision. Therefore, comparing with a conventional seat back using a headrest drive, the structure and operation principle are simple, and an occupant's head is held when a vehicle is bumped from behind. Further, the weight and number of parts are not increased from those of a conventional seat back.

The invention may be embodied by appropriately changing the constituent elements such as a seat back frame, plane spring structure, pad member and detachable portion of a connection wire. For example, it is possible to provide a portion corresponding to a connection wire in a part of a horizontal wire by extending both ends of a horizontal wire, and to provide a detachable portion that can be detached from a seat back frame, at the end of the connection wire frame.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle seat comprising:
   a seat cushion;
   a seat back which is provided behind the seat cushion, and which is provided with a seat back frame having left and right side frame units;
   a headrest provided at an upper end of the seat back frame;
   a plane spring structure which is provided inside the seat back frame, and which includes left and right side wires extending in a vertical direction, and horizontal wires provided between the left and right side wires at intervals in the vertical direction, wherein upper end portions of the side wires are secured to an upper part of the seat back frame, lower ends of the side wires are set free without being secured to the seat back frame, whereby when a rearward load is applied from the seat back to the plane spring structure, the plane spring structure is moved rearward about the upper end portions of the side wires and a lower half part of the plane spring structure is moved farther than an upper half part of the plane spring structure;
   a pad member provided on a front side of the plane spring structure; and
   connection wires which are provided between the side frame units of the seat back frame and the side wires of the plane spring structure, wherein the connection wires include detachable portions, and wherein at least one of the detachable portions is detachable from the plane spring structure or the seat back frame when a load is applied to the seat back from an occupant sitting on the seat cushion due to a vehicle in which the vehicle seat is provided being bumped from behind.

2. The vehicle seat according to claim 1, wherein the detachable portions of the connection wires are detached from the plane spring structure or the seat back frame when the load applied to the seat back is over 150 kgf and below 800 kgf.

3. The vehicle seat according to claim 2, wherein the detachable portions of the connection wires comprise U-shaped hooks.

4. The vehicle seat according to claim 3, wherein the connection wires are arranged in the lower half part of the plane spring structure.

5. The vehicle seat according to claim 3,
   wherein the connection wires include upper side connection wires arranged in the upper half part of the plane spring structure, and lower side connection wires arranged in the lower half part of the plane spring structure,
   wherein when the load is applied to the seat back at least one of the detachable portions of the lower side connection wires is detached.

6. The vehicle seat according to claim 1, wherein the detachable portions of the connection wires comprise U-shaped hooks.

7. The vehicle seat according to claim 6, wherein the connection wires are arranged in the lower half part of the plane spring structure.

8. The vehicle seat according to claim 6,
   wherein the connection wires include upper side connection wires arranged in the upper half part of the plane spring structure, and lower side connection wires arranged in the lower half part of the plane spring structure, and
   wherein when the load is applied to the seat back at least one of the detachable portions of the lower side connection wires is detached.

9. The vehicle seat according to claim 1,
   wherein the detachable portions of the connection wires are provided on at least one end of the connection wires and are removably attached to a respective one of (i) the left and right side frame units of the seat back frame and (ii) the left and right side wires of the plane spring structure, in accordance with the at least one end of the connection wires on which the detachable portions are provided, and
   wherein when the load is applied to the seat back from the occupant sitting on the seat cushion, at least one of the detachable portions is detached from the respective one of the left and right side frame units of the seat back frame and the left and right side wires of the plane spring structure.

10. The vehicle seat according to claim 1,
    wherein the detachable portions of the connection wires include first detachable portions which are removably attached to the side frame units of the seat back frame, and second detachable portions which are removably attached to the side wires of the plane spring structure, and
    wherein when the load is applied to the seat back from the occupant sitting on the seat cushion, at least one of the first and second detachable portions is detached from the respective one of the side frame units of the seat back frame and the side wires of the plane spring structure.

* * * * *